C. O. NEPSTAD.
FLOUR SIFTER.
APPLICATION FILED DEC. 24, 1919.
1,354,415. Patented Sept. 28, 1920.
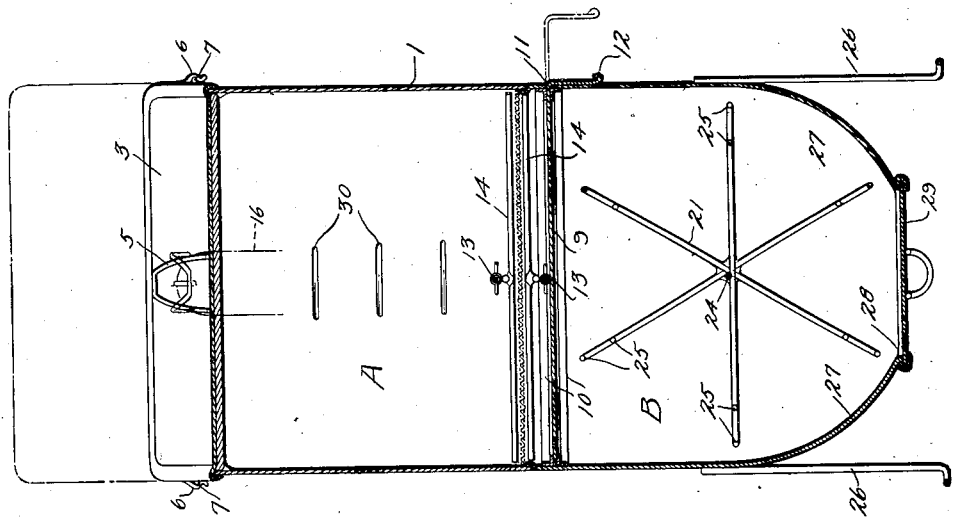
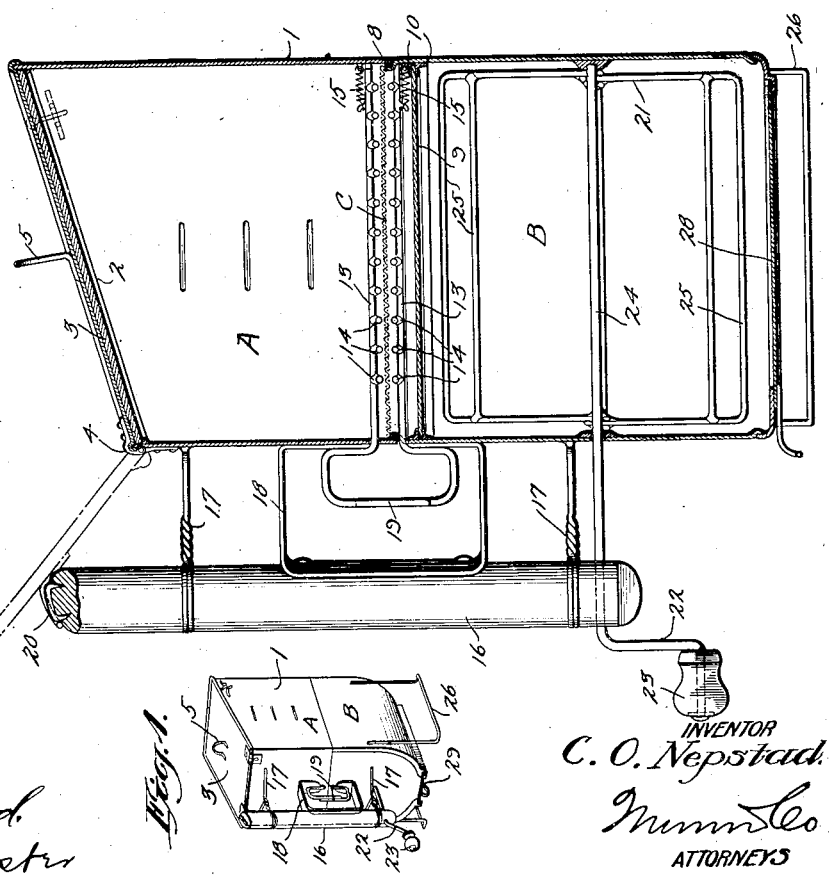
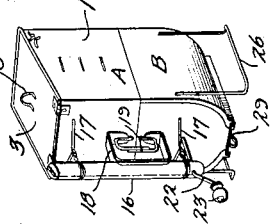

UNITED STATES PATENT OFFICE.

CARL OSCAR NEPSTAD, OF WATFORD, NORTH DAKOTA.

FLOUR-SIFTER.

1,354,415.  Specification of Letters Patent.  Patented Sept. 28, 1920.

Application filed December 24, 1919. Serial No. 347,129.

*To all whom it may concern:*

Be it known that I, CARL O. NEPSTAD, a citizen of the United States, and a resident of Watford city, in the county of McKenzie and State of North Dakota, have invented a new and Improved Flour-Sifter, of which the following is a full, clear, and exact description.

This invention relates to improvements in flour sifters, an object of the invention being to provide improved means for agitating the flour to cause the same to move through a screen and which is so constructed that the flour can be moved backwardly and forwardly through the screen until it is sifted to suit conditions.

A further object is to provide a device of the character stated, which is capable of a wide variety of use, and which will most efficiently perform the functions for which it is intended.

With these and other objects in view the invention consists in certain novel features of construction, and combinations and arrangements of parts, as will be more fully hereinafter described and pointed out in the claims.

In the accompanying drawings—

Figure 1 is a perspective view illustrating my improved device;

Fig. 2 is an enlarged view in vertical section; and

Fig. 3 is a view in vertical section at right angles to Fig. 2.

1 represents a casing which is preferably rectangular in cross-section, although it may be of any desired shape. The casing 1 at its upper end is inclined, as shown at 2, to allow the device to be used as a scoop. This upper end of the casing is normally closed by a cover 3 hingedly connected at one end, as shown at 4, and provided with a bail 5 constituting a handle facilitating the opening of the cover and for another purpose as will more fully hereinafter appear.

The cover 3 is adapted to snugly fit the end of the casing and has spring locking tongues 6 engaging studs 7 at the sides of the casing to effectually lock the cover in place.

The casing 1 is preferably made in two sections forming two compartments A and B. On the upper end of the lower compartment B a screen C is secured. This screen may be secured in various ways, but I have illustrated the same as fixed to the end of the section B by means of solder 8 and the upper end of the section B internally offset to accommodate the lower end of the section A so that a smooth outer surface is provided on the casing. A sliding shutter 9 is supported in suitable guides 10 at the upper portion of the compartment B below the screen C and is movable through a slot 11 in the wall of the casing and provided with a handle 12 to manipulate the same.

A pair of reciprocating agitators 13 are provided above and below the screen C. These reciprocating agitators preferably comprise a central rod having transversely positioned rods 14 fixed at their centers to the longitudinal rod so that all of the rods will move together. The inner ends of the agitators 13 are connected by coiled springs 15 with the wall of the casing so that these springs tend to hold the agitators in one position and return them to such position.

A handle 16 is positioned parallel with the casing 1 and connected to the casing by brackets 17 and 18. The brackets 17 are preferably of twisted wires having their ends secured to the casing and their intermediate portions coiled about the handle 16. The bracket 18 is preferably of sheet metal having its intermediate portion secured to the handle and its ends to the casing. A looped-shaped handle 19 is fixed to or made integral with the agitators 13 so that when the operator grips the handle 16, he can, with his fingers positioned through the looped handle 19, readily move the agitators 13 to insure a sifting of the flour through the screen C, as will be readily understood. A staple 20 is fixed in the upper end of the handle 16 and forms a shoulder over which the wire handle 5 of cover 3 will spring and hold the cover in open position, as shown clearly in Fig. 2.

In the lower compartment B a rotary agitator 21 is located and secured upon a shaft 24 which extends through the casing and also through the handle 16 and is provided at its free end with a crank arm 22 having a handle 23 thereon. The rotary agitator 21 comprises a circular series of blades having parallel transversely projecting members 25 at their free ends, as clearly shown in Figs. 2 and 3. The casing 1 is preferably supported on suitable feet 26 which may be of wire, as indicated, supporting the lower end of the casing above the table or other device on which it may be located. This lower end of the casing is tapered, as shown at 27, forming a relatively restricted open end 28 normally closed by a sliding cover 29.

While, of course, my improved device is capable of many different operations, I will describe the ordinary operation as follows: When the flour is placed in the upper compartment A and the shutter 9 removed, the reciprocating agitators 13 are operated to cause the flour to pass through the screen into the lower compartment B. The shutter is then replaced and the larger particles remaining in the compartment A are emptied when the cover 3 is opened. The cover 3 is then tightly closed and the casing reversed in position so that the compartment B is uppermost. The shutter 9 is again removed and the rotary agitator 21 operated to compel the flour to again sift through the screen C. The reciprocating agitators 13 may also be operated in this return movement of the flour, if desired.

After this operation is completed, the shutter 9 is replaced and the cover 29 opened to empty the larger particles remaining in the compartment B. It will thus be seen that the flour will be returned to the compartment A thoroughly sifted and can be used as desired.

By reason of the fact that I provide covers or closures at both ends of the casing and provide means whereby the flour may be sifted in both directions through the screen, it is obvious that the device may be used in any way to suit the operator and lends itself to a wide range of utility.

The compartment A is preferably provided with suitable marks 30 indicating measurements, as for example, cups, and various slight changes may be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A flour sifter, comprising a casing, a screen located between the ends of the casing, agitators above and below the screen, a shutter below the lower screen dividing the casing into two compartments, a handle on the outside of the casing affording a grip to reciprocate the agitators, and a rotary agitator below the shutter.

2. A flour sifter, comprising a casing, a screen located between the ends of the casing, agitators above and below the screen, a shutter below the lower screen dividing the casing into two compartments, a handle on the outside of the casing affording a grip to reciprocate the agitators, and a rotary agitator below the shutter, said casing having a restricted outlet at its lower end and having covers for the respective ends of the casing.

3. A flour sifter, comprising a casing, feet at one end of the casing supporting the latter, said casing open at both ends, a sliding cover at the lower end of the casing, a hinged cover at the upper end of the casing, a screen in the casing, a sliding shutter below the screen dividing the casing into two compartments, reciprocating agitators in the upper compartment at both sides of the screen, a rotary agitator in the lower compartment, a handle secured to the casing, and means adjacent the handle for operating the respective agitators.

4. A flour sifter, comprising a casing, feet at one end of the casing supporting the latter, said casing open at both ends, a sliding cover at the lower end of the casing, a hinged cover at the upper end of the casing, a screen in the casing, a sliding shutter below the screen dividing the casing into two compartments, reciprocating agitators in the upper compartment at both sides of the screen, a rotary agitator in the lower compartment, a handle secured to the casing, and a looped handle on the reciprocating agitator located adjacent the casing handle.

5. A flour sifter, comprising a casing, feet at one end of the casing supporting the latter, said casing open at both ends, a sliding cover at the lower end of the casing, a hinged cover at the upper end of the casing, a screen in the casing, a sliding shutter below the screen dividing the casing into two compartments, reciprocating agitators in the upper compartment at both sides of the screen, a rotary agitator in the lower compartment, a handle secured to the casing, a handle connected to the reciprocating agitator, a shaft supporting the rotary agitator and projecting through the first-mentioned handle, a crank arm on the shaft, and a handle on the crank arm.

CARL OSCAR NEPSTAD.